United States Patent
Saha et al.

(10) Patent No.: US 9,763,102 B2
(45) Date of Patent: Sep. 12, 2017

(54) RESOURCES IN A COMMUNICATION SYSTEM

(71) Applicant: Nokia Solutions and Networks Oy, Espoo (FI)

(72) Inventors: Kaustuv Saha, Bangalore (IN); Amaanat Ali, Bangalore (IN); Ayaz Ahmed, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 37 days.

(21) Appl. No.: 14/785,864

(22) PCT Filed: Apr. 22, 2013

(86) PCT No.: PCT/EP2013/058273
§ 371 (c)(1),
(2) Date: Oct. 21, 2015

(87) PCT Pub. No.: WO2014/173430
PCT Pub. Date: Oct. 30, 2014

(65) Prior Publication Data
US 2016/0073266 A1    Mar. 10, 2016

(51) Int. Cl.
*H04W 72/04* (2009.01)
*H04W 16/04* (2009.01)
*H04W 92/22* (2009.01)

(52) U.S. Cl.
CPC ......... *H04W 16/04* (2013.01); *H04W 72/044* (2013.01); *H04W 92/22* (2013.01)

(58) Field of Classification Search
CPC . H04W 16/04; H04W 72/044; H04W 76/045; H04W 76/046
See application file for complete search history.

(56) References Cited

U.S. PATENT DOCUMENTS

| | | | | |
|---|---|---|---|---|
| 2004/0230675 | A1* | 11/2004 | Freimuth | H04L 12/5695 709/223 |
| 2008/0165727 | A1* | 7/2008 | Xiaoben | H04W 16/04 370/329 |
| 2009/0307685 | A1* | 12/2009 | Axnix | G06F 8/60 717/174 |
| 2011/0238793 | A1* | 9/2011 | Bedare | H04L 29/12283 709/220 |

FOREIGN PATENT DOCUMENTS

| | | |
|---|---|---|
| EP | 1 883 258 A1 | 1/2008 |
| EP | 2 437 532 A1 | 4/2012 |

* cited by examiner

*Primary Examiner* — Jamal Javaid
(74) *Attorney, Agent, or Firm* — Harrington & Smith

(57) ABSTRACT

A shortage of at least one resource is determined in a first radio network control entity that has joined a pool of radio network control resources. The first radio network control entity signals to at least one second radio network control entity of the pool a request for at least one resource. The at least one second radio network control entity receives the request for at least one resource and offers for the first radio network control entity.

20 Claims, 6 Drawing Sheets

RESOURCES IN A COMMUNICATION SYSTEM

This disclosure relates to use of resources in a communication system and more particularly to sharing of resources.

A communication system provides a facility that enables communication sessions between two or more entities such as fixed or mobile communication devices, base stations, servers, machine type devices and/or other communication nodes. A communication system and compatible communicating entities typically operate in accordance with a given standard and/or specification setting out how the various entities shall operate. In a wireless communication system at least a part of the communication between at least two devices, or stations occurs over a wireless interface. Wireless communication systems include various cellular or otherwise mobile communication systems using radio frequencies for sending voice or data between stations, for example between a communication device and a transceiver network element.

A mobile communication network may logically be divided into a radio access network (RAN) and a core network (CN). A radio access network provides a connection between the core network (CN) and a communication device such as a user equipment (UE). Examples of radio access networks may comprise the Universal Mobile Telecommunications System (UMTS) terrestrial radio access network (UTRAN), the GSM/EDGE radio access network (GERAN) and/or enhanced UTRAN (EUTRAN) for long term evolution (LTE). The radio access network may include various element and functionalities such as a base station (BS), node B (NB), enhanced node B (eNB), base station subsystem (BSS) and/or a radio network controller (RNC).

Use of resources in an access system such as a radio access network is controlled by at least one controlling entity. For example, in accordance with third generation partnership (3GPP) specifications control in an access system provide by a radio access network (RAN) can be provided by a radio network controller (RNC). The role of the RNC in the UTRAN is to allocate control and user plane resources to UEs served in the cells controlled by the RNC. Control plane and user plane resources are typically a combination of both hardware and software resources.

Different types of UEs and other devices can be served by a radio access network. For example, a radio access network may serve smartphones, tablets, laptops, dongles and other wireless interface devices, ordinary mobile phones, machine type terminals and so forth. Depending on the type of the device the resource requirements of calls and other sessions by the devices can vary considerably. For example, control plane load relates to signalling used for establishing, maintaining and terminating calls. On the other hand, user plane load relates to operations performed during transmission and reception of data payload, e.g. Radio Link Control (RLC) and Medium Access Control (MAC) specific processing, ciphering, header compression and so on. The various resources can be provided e.g. during radio resource control (RRC) connection establishment or during an ongoing connection.

Because of exponential rise in subscriber traffic, the demand for more processing resources from radio network controllers is on the increase. User plane and control plane resources are, to an extent, uncorrelated. Thus, a high demand for user plane resources does not imply that an equally high amount of control plane resources will also be requested. The resource processing capacity of a radio network controller can be limited. There is a risk that the demand may not be satisfied in all occasions, in particular since the increased demand. This can result decrease in service level, unsuccessful connection establishments and/or dropped connections.

It is noted that the issues discussed here are not limited to any particular communication environments and apparatus.

Embodiments of the invention aim to address one or several of the above issues.

In accordance with an aspect there is provided a method in a first radio network control entity, comprising determining shortage of at least one resource in the first radio network control entity that has joined a pool of radio network control resources, signaling from the first radio network control entity to at least one second radio network control entity of the pool a request for at least one resource, and using by the first radio network control entity at least one resource provided by at least one second radio network control entity.

In accordance with another aspect there is provided a method in a pool of radio network control resources, comprising receiving in at least one second radio network control entity of the pool a request for at least one resource, the request being determined in response to shortage of at least one resource in the first radio network control entity, and offering for the first radio network control entity at least one resource provided by at least one of the second radio network control entities.

In accordance with another aspect there is provided apparatus for a first radio network control entity that has joined a pool of radio network control resources, the apparatus comprising at least one processor, and at least one memory including computer program code, the at least one memory and the computer program code being configured to, with the at least one processor, cause the apparatus at least to determine shortage of at least one resource in the first radio network control entity, signal to at least one second radio network control entity of the pool a request for at least one resource, and use by the first radio network control entity at least one resource provided by at least one second radio network control entity.

In accordance with yet another aspect there is provided apparatus for a radio network control entity that has joined a pool of radio network control resources comprising a first radio network control entity and at least one second radio network control entity, the apparatus comprising at least one processor, and at least one memory including computer program code, the at least one memory and the computer program code being configured to, with the at least one processor, cause the apparatus at least to receive a request for at least one resource, the request being determined in response to shortage of at least one resource in the first radio network control entity, and offer for the first radio network control entity at least one resource provided by the second radio network control entity.

In accordance with a more detailed aspect the first and second radio network control entities comprise each a local load sharing protocol function. Signalling between the first and second radio network control entities regarding load sharing is provided between the local load sharing protocol functions. The first radio network control entity may not be aware whether the at least one resource is provided locally or remotely by at least one second radio network control entity.

The local load sharing protocol function may support partitioning of resources into sub-resources and provision of sub-resources by the pool.

A local load sharing protocol function may provide translating between logical services and physical services by a local resource management function.

A radio network control entity may dynamically join and separate from the pool. It may advertise its presence to the other members accordingly.

Signalling of the request for the at least one resource may comprise signalling the request to a plurality of second radio network control entities in the pool. Upon receiving responses from the plurality of second radio network control entities one of them may be selected as the provider of the at least one resource.

A three way handshake may be provided. The first radio network control entity may signal a message based on selection of a second radio network control entity as the provider of the resources to the selected second radio network control entity and releasing provisionally allocated resources in other second radio network control entities. The release may be based on a signal from the first radio network control entity and/or a timer.

Each of the radio network control entities can comprise a local load sharing protocol function and a local resource management function. Signalling within a radio network control entity may comprise a message to the local load sharing protocol function requesting for allocation of the at least one resource, a message from the local load sharing protocol function to the local resource management function requesting for allocation of the at least one resource, and a message from the local resource management function in response thereto. In response to the response message the requested at least one resource may be provided by the radio network control entity or at least one message is signalled requesting for allocation of the at least one resource by at least one second radio network control entity.

Information regarding availability of requested resources or parts thereof may be signalled between the various entities and functions.

A radio network controller entity configured to implement the various aspects may also be provided.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are also described in the following detailed description of examples embodying the invention and in the attached claims.

The invention will now be described in further detail, by way of example only, with reference to the following examples and accompanying drawings, in which.

In the following certain examples are explained with reference to a wireless or mobile communication system serving mobile communication devices. Before explaining the examples in detail, certain general principles of a wireless communication system, components thereof, and mobile communication devices are briefly explained with reference to FIGS. 1 and 2 to assist in understanding the technology underlying the described examples.

Figure 1:
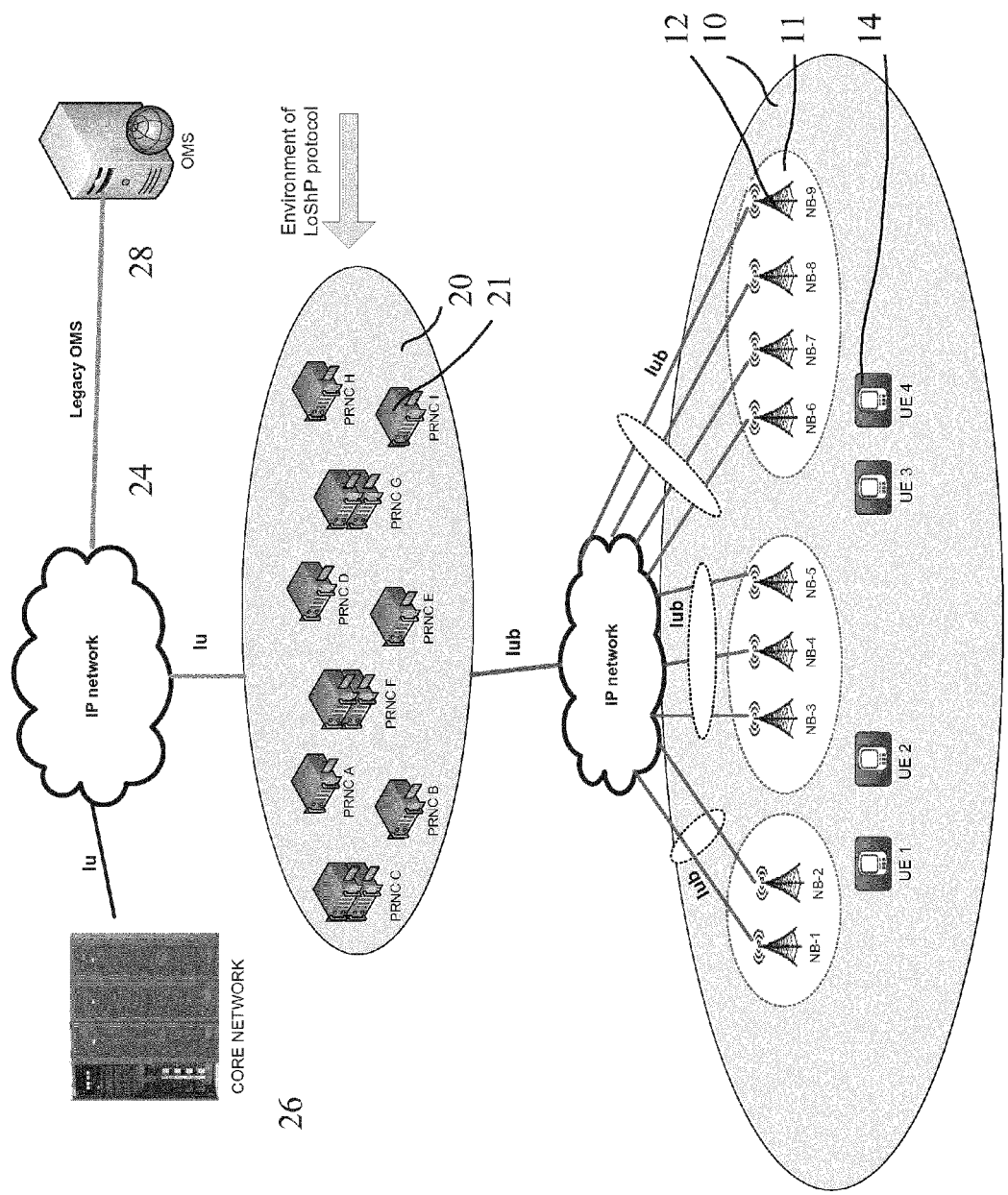
FIG. 1 shows an example of a communication system wherein below described examples of the invention may be implemented.

A user can use a mobile communication device 14 for his/hers communication needs. Such a communication device is often referred to as user equipment (UE) or terminal. A mobile communication device 14 is typically provided wireless access via at least one radio access system provided by a node such as a base station or similar wireless transceiver node. An access system may be provided by a radio access network of a cellular system or another radio service system enabling a communication device to access a communication system. In FIG. 1 base stations 12 provide radio access networks 11 of a cellular system 10. A radio access network may comprise one or more cells. It is noted that in the schematic presentation of FIG. 1 the borders of various networks are shown by oval shaped patterns for illustration purposes only.

An appropriate mobile communication device may be provided by any device capable of sending and receiving radio signals. Non-limiting examples include a mobile station (MS) such as a mobile phone or what is known as a 'smart phone', a portable computer provided with a wireless interface card, a dongle or other wireless interface facility, personal data assistant (PDA) provided with wireless communication capabilities, a tablet, or any combinations of these or the like. A mobile communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet. A communication device accessing the communication system via a radio access system may also comprise a static or semi-static device, such as a machine type terminal, a router and so forth.

A communication device is typically provided with at least one data processing entity, at least one memory and other possible components for use in software and hardware aided execution of tasks it is designed to perform, including control of access to and communications with base stations and other communication devices. The data processing, storage and other relevant control apparatus can be provided on an appropriate circuit board and/or in chipsets. The user may control the operation of the mobile device by means of a suitable user interface such as key pad, voice commands, touch sensitive screen or pad, combinations thereof or the like.

A base station and the associated radio access network is typically controlled by at least one appropriate control entity so as to enable operation thereof and management of mobile communication devices in communication with the base station. A control entity can be interconnected with other control entities. In FIG. 1 a control facility for a radio access system is shown schematically as being provided by a pool 20 of radio network controller entities 21. A suitable control apparatus for each entity can be provided with memory capacity and at least one data processor, as will be explained in more detail later. In the pool control resources can be distributed between a plurality of control entities. The control entities in the pool of can be connected via an interface arrangement for signalling purposes, as will be discussed below. The connection between control entities may involve intermediate nodes.

Figure 2:
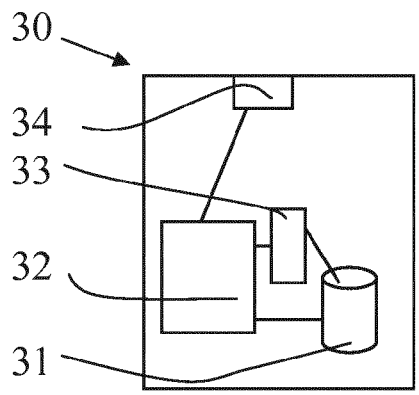
FIG. 2 shows an example of control apparatus for a radio access network.

FIG. 2 shows an example of a control apparatus 30, for example to be coupled to and/or integrated with a radio network controller 21 for providing operation in accordance with certain examples described below. The control apparatus 30 can be arranged to process and/or control signalling and other communications related to resource sharing for serving mobile communication devices in the service area 10. The control apparatus 30 can be configured to provide control functions in association with exchange of information regarding pooling of resources between two or more radio network controllers 21. A signalling functionality provided by apparatus 30 can be added to an existing radio network controller (RNC). This can be done either as an external hardware and software component or as an integrated software component within an existing RNC, using at least partially the hardware resources of the RNC.

For providing the control the control apparatus 30 can comprise at least one memory 31, at least one data processing unit 32, 33 and an input/output interface 34. Via the interface the control apparatus can be coupled to other members of the pool. The control apparatus 30 can be configured to execute an appropriate software code to provide the control functions.

In FIG. 1 example access systems controllers are connected via an Internet Protocol (IP) network 24 to a core network 26. Connection to operation and maintenance system (OMS) 29 is also shown.

Non-limiting examples of radio access systems comprise those based on the long-term evolution (LTE) of the Universal Mobile Telecommunications System (UMTS) that is standardized by the 3rd Generation Partnership Project (3GPP). A type of LTE base station is known as NodeB (NB) and another as enhanced or evolved NodeB (eNB) in the vocabulary of the 3GPP specifications. Features such as user plane Radio Link Control/Medium Access Control/Physical layer protocol (RLC/MAC/PHY) and control plane Radio Resource Control (RRC) protocol terminations towards the communication devices can be provided. LTE based systems can employ a mobile architecture known as the Universal Terrestrial Radio Access Network (UTRAN) or Evolved Universal Terrestrial Radio Access Network (E-UTRAN). Other examples of providing a mobile device with access to a communication system include those provided by stations of systems that are based on technologies such as wireless local area network (WLAN) and/or WiMax (Worldwide Interoperability for Microwave Access). WLANs are sometimes referred to by WiFi™, a trademark that is owned by the Wi-Fi Alliance, a trade association promoting Wireless LAN technology and certifying products conforming to certain standards of interoperability.

Modern networks such as those based on the third generation (3G) network architectures are in the risk running out of radio network control (RNC) processing resource capacity. This is so because of exponential rise in subscriber traffic demanding for more RNC processing resources. At the same the time not all RNC processing nodes are fully occupied at all times. This is so because there can be varying traffic patterns in live network operation. For example, a RNC can become overloaded during day time in urban geographies whereas it can have unused resource during evenings and/or night time. A RNC in suburban geographies can become heavily loaded during evenings and night time.

Overloading can occur in control and/or user plane. Control and user plane overloads are to a large extent, uncorrelated issues in current 3G networks. Current solutions scale inefficiently if they would be required to do so. For example, if smartphones are dominant in a given traffic model, control plane load scaling would be required. Likewise, for dongles user plane load scaling would be beneficial. In accordance with one aspect observed imbalances in current networks are normalised by creating a dynamic pool of RNC resources. A radio access network (RAN) resource sharing is provided between a plurality of pooled RNCs. When a RNC faces resource shortage, i.e. control or user plane overload, it requests a less loaded RNC to take over control or user plane load, or both. By using a dynamically managed pool the average resource utilization efficiency can be improved.

Figure 3:
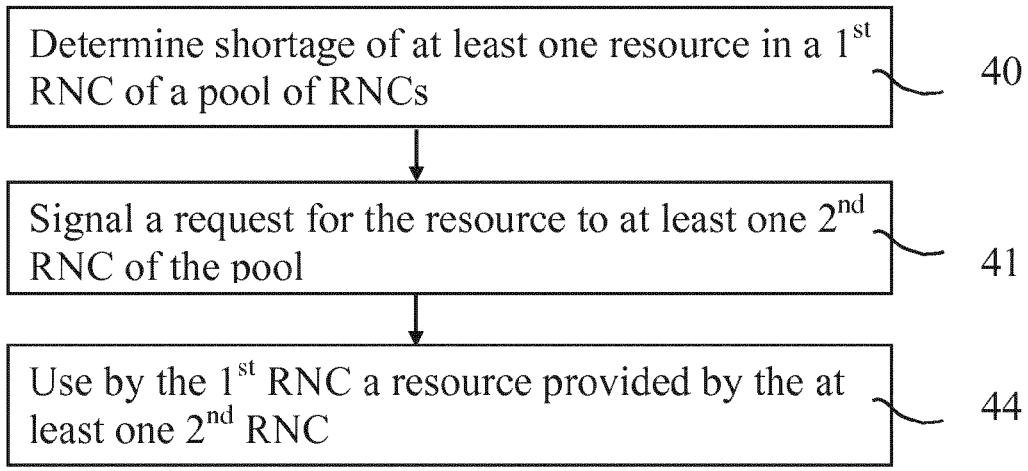
FIGS. 3 and 4 are flowcharts according to certain examples.

FIG. 3 shows a flowchart for operation in a first radio network control entity, i.e. in an entity that may need to request for additional resources. The entity can join a pool of radio network control resources, the pool comprising at least one second radio network control entity. At 40 a shortage of at least one resource in the first radio network control entity is detected, where after the first radio network control entity communicates at 41 to at least one second radio network control entity in the pool a request for the at least one resource. If the request is successful, and resources are offered, the first radio network control entity can use at least one resource provided by at least one second radio network control entity at 44.

Figure 4:
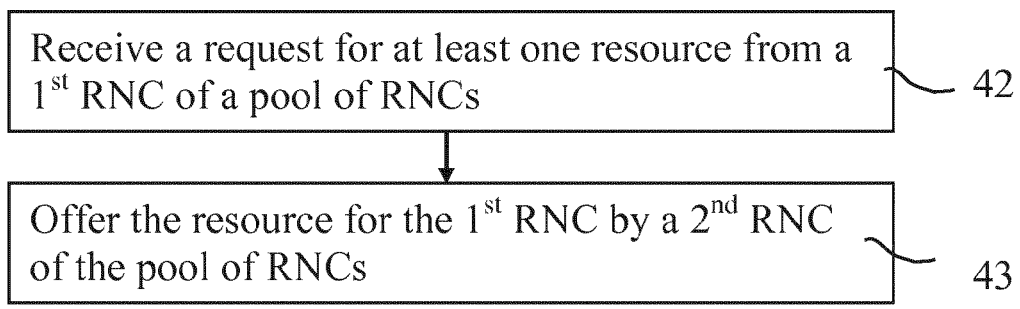

FIG. 4 shows a method in a pool of radio network control resources from the point of view of one of resource donating entities. At 42 a second radio network control entity receives from a first radio network control entity a request for at least one resource. As mentioned above, the request was determined in response to shortage of at least one resource in the first radio network control entity. The request receiving entity may then check if it has the resource available, and offer at 43 for the first radio network control entity at least one resource.

In accordance with the embodiment an overloaded RNC can approach a plurality of RNCs in the pool for resources. This increases the probability of acquiring a free resource. The RNC call processing application does not need to know whether the resources come from itself or from one or more other RNCs in the pool. The brokering of resources for a call or other session can be handled by a load sharing protocol. By keeping the management of the pool for load sharing automatic enables minimal operator intervention. Also, efficiency of use of resources can be increased.

FIG. 1 shows a particular example where several physical RNC (PRNC) resources 21 are grouped together to provide a RNC pool 20. All RNCs in the pool can be connected to each other via appropriate networking protocols e.g. IP, ATM etc. For the purpose of this description the term cluster interface is used for interface that connects RNCs in a pool. The PRNCs 21 are connected to the Core Network 26 via Iu interface, to Node-Bs 12 via Iub interfaces and to the OMS 28 via proprietary interface. According to the herein described principles of pooling any of the PRNCs should be able to provide resources to the UEs 14.

In accordance with an aspect a load sharing protocol (LoShP) is provided and implemented in the RNCs to provide the functionality of dynamic load sharing model in the context of an RNC pool.

Figure 5:
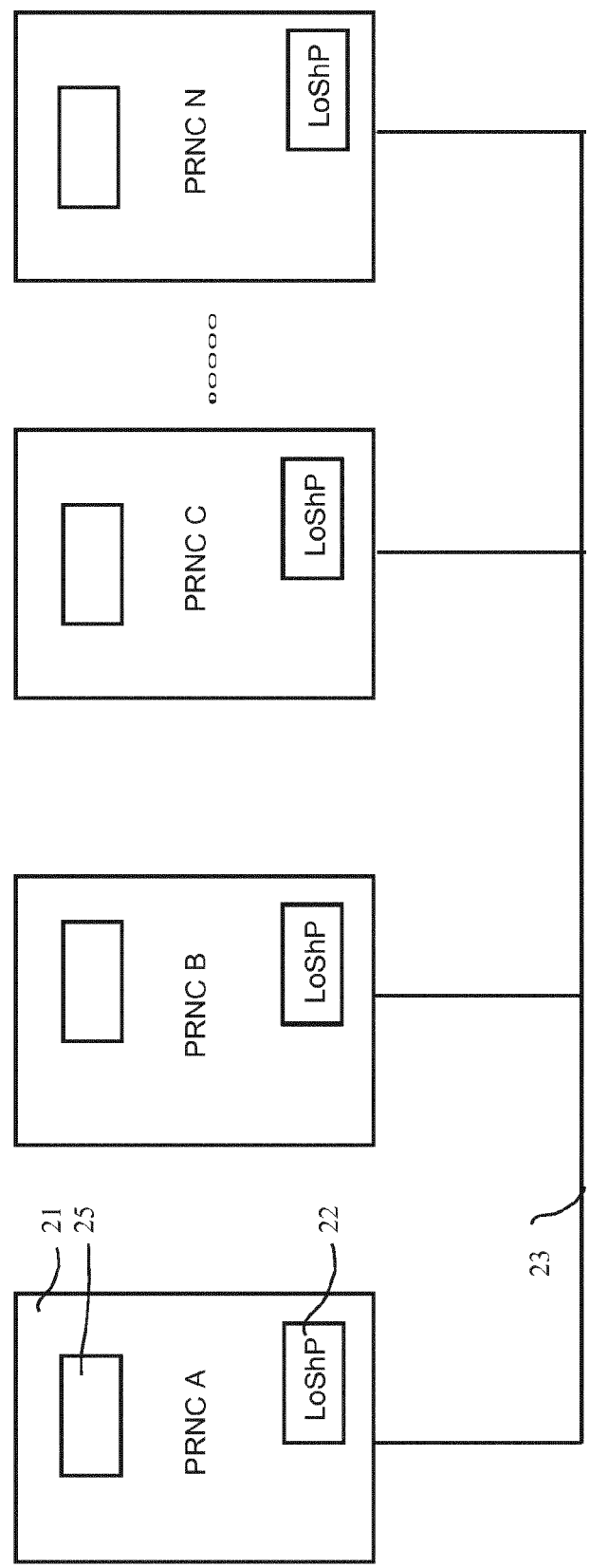
FIG. 5 shows schematic diagram of a pool of RNC entities and their components.

An example of implementation of the LoShP protocol can be provided for example by framework shown in FIG. 5. A LoShP function is provided by component 22 in each PRNC 21. Each RNC can be provided with a resource management entity by means of component 25 for providing local resource management functions. In addition to local resource management entity 25 can provide features such as call processing and so on. An application function may also be provided in a RNC. This can be integrated with the hardware and/or software of the resource management function, or be provided as a separate entity. A RNC cluster interface 23 between the RNCs is also shown.

A radio network control entity, e.g. a RNC, can be configured to implement a Load Sharing Protocol (LoShP) which is capable of providing at least some of the following functionalities:

1. Enable a RNC to dynamically add/remove itself from the RNC pool. For example, each RNC can advertise its presence in a RNC pool on joining/leaving the RNC pool.
2. Provide an interface to a RNC application to request/grant resources and provide additional functionality of breaking a request to different entities individually to hunt for control plane resources, user plane resources or both resources. The resources can be partitioned into sub-resources based on any appropriate partitioning scheme. A RNC can then request only for the needed sub-resources from the pool. The partitioning takes place at the requesting RNC. In accordance with a possibility the requesting RNC can indicate in the request, if hierarchical resource search/allocation is permitted e.g. via negotiation, forwarding, etc. For example, a requested entity may forward a request for resources to another member of the pool.
3. Provide algorithms to mitigate fragmentation of resources and cluster interface overload.
4. Implement a three way handshake protocol to prevent collision during granting of resources. Examples of three way handshake are explained in connection with FIGS. 7 and 8.
5. Maintain configuration and data structures with respect to the load sharing information. This functionality relates to when the protocol function joins or leaves an RNC pool. For example, an RNC may need to leave the pool suddenly in an emergency situation. In such case a local LoShP function must clean up all resources associated with that RNC on the local RNC. This also provides a basic book-keeping function and can be used to provide key performance indicator (KPI) and/or counter based view of resource allocation status.
6. Allow an RNC to signal the controlling i.e. donor RNC(s) for all shared resource allocations about exception conditions for these UE contexts. This may be provided e.g. if the RNC is shutting down and the UE resources need to be reallocated to another RNC in the pool.

The LoShP feature in a RNC can be invoked e.g. by a RNC call processing application to request resources. The invoking may take place in different scenarios. Example of possible use scenarios include RRC establishment/re-establishment, CELL FACH to CELL DCH transition, URA PCH/CELL PCH to CELL DCH transition, SRNS relocation when source and target RNC are in same pool area, and Multi-RAB establishment.

According to a possibility LoShP components 22 within the PRNCs 21 can address each other. Communication for resource reservation can be strictly from a requesting entity to a local LoShP of that entity to a remote LoShP of a requested entity. This provides abstraction or encapsulation of LoShP functionality from applications requesting services.

A LoShP can provide logical services. Translation of logical services to physical services can be done by a local entity specific resource management function. This is beneficial since the local entity may have different implementation constraints and hardware constraints.

Protocol messages can be of different types. In accordance with a type messages have a request/response pair. In this case a transaction can have multiple messages, e.g. resource reservation is a three way handshake. Other type is messages that do not have a request/response pair. These can be used e.g. to signal certain exception conditions.

The LoShP based arrangement can be adapted to provide a maximum latency guarantee for completion of remote resource allocation within the RNC resource pool. This is beneficial so as not to impact aggregate RRC connection establishment times and so on. Such requirement can imply that all PRNCs within a RNC resource pool be "located" such that basic inter-RNC connectivity latency is within certain thresholds.

Figure 6:
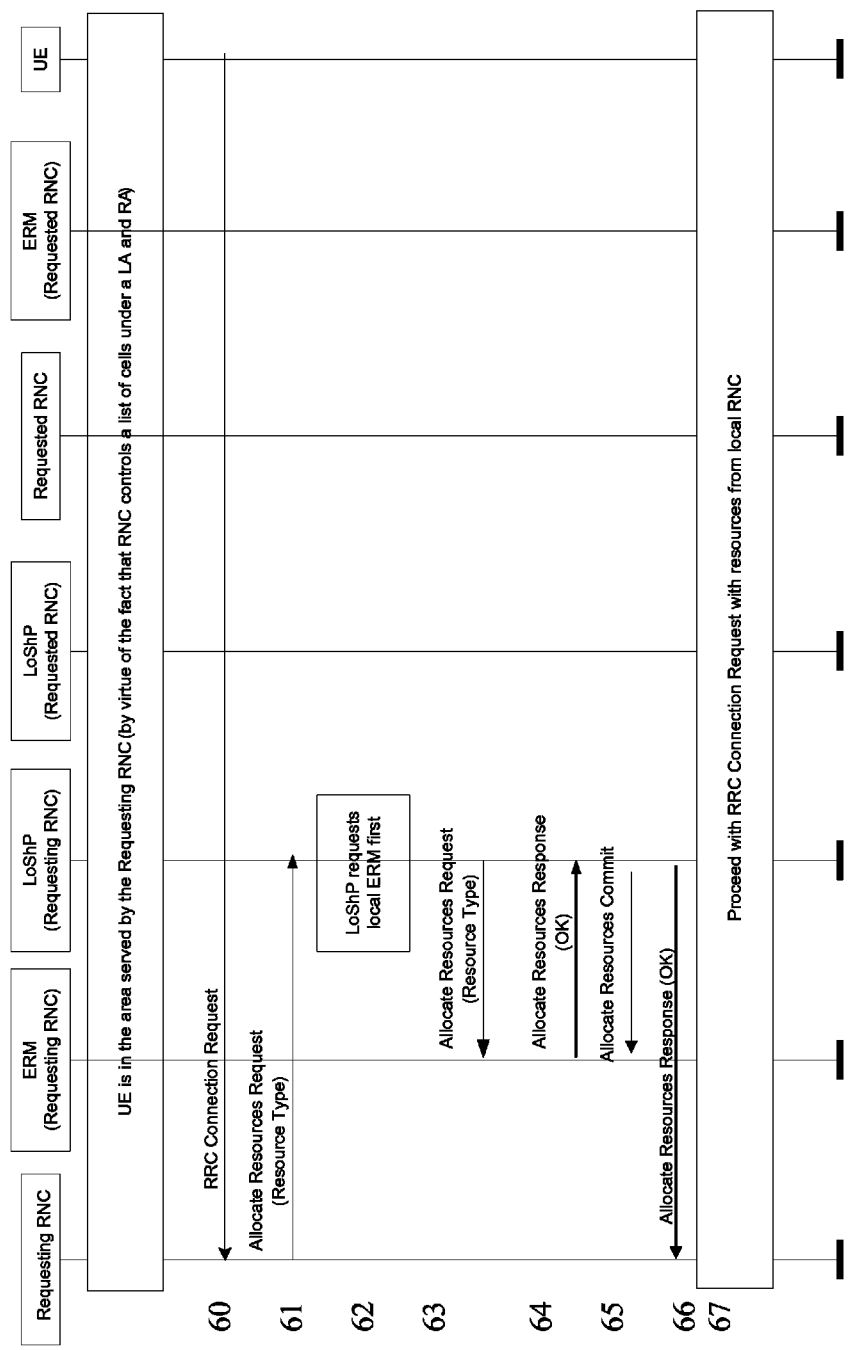
FIGS. 6 to 8 are signalling flowcharts illustrating certain examples.

FIG. 6 shows a signalling flow chart illustrating an example of scenario where a requesting RNC has processing resources for a UE in its service area. A radio resource control request message 60 is received from the UE at the RNC, this message triggering a resource allocation request. The resource allocation request from the local requesting entity can also be triggered due to many other reasons, e.g. RRC state transition or even congestion control. A message 61 requesting for resource allocation is sent to the LoSHP function of the requesting RNC. The LoShP determines at 62 that a local entity resource management (ERM) of the requesting RNC is the first point of contact for obtaining the resource. The resource allocation request will then be passed by message 63 on to the local entity resource management (ERM) function of the requesting RNC. Since in this case the requested resources are determined available locally, OK response 64 is sent from the local ERM to the LoShP function. Allocate resources response OK message 65 is then returned to the requesting RNC.

In accordance wi a possibility the protocol an also support for resource partitioning. In response to the Resource Request 63 from LoShP to local resource management entity the Resource_Response 64 can indicate if "all", "none" or "partial" resources are available from local resource management point of view. If availability of partial resource is indicated, some detail of these can also be indicated.

An allocate resources commit message 66 can also be signalled to the local ERM. Local resource management can provisionally reserve the underlying resources and the LoShP can send the commit message 66 to the local resource management once all resources have been procured locally and/or remotely along with the commit message to the remote LoShP, if applicable.

The RNC can then proceed at 67 with the connection request with local resources. Thus in FIG. 6 the RRC connection request from the UE is resolved with resources allocated from the local RNC. Requesting RNC is not necessarily aware from where resources are procured. Allocation of "local" resources can be defined as the first choice as this limits the additional signalling overhead entailed in resource sharing across RNCs and hence improves the aggregate capacity of the pool of RNC resources.

Figure 7:
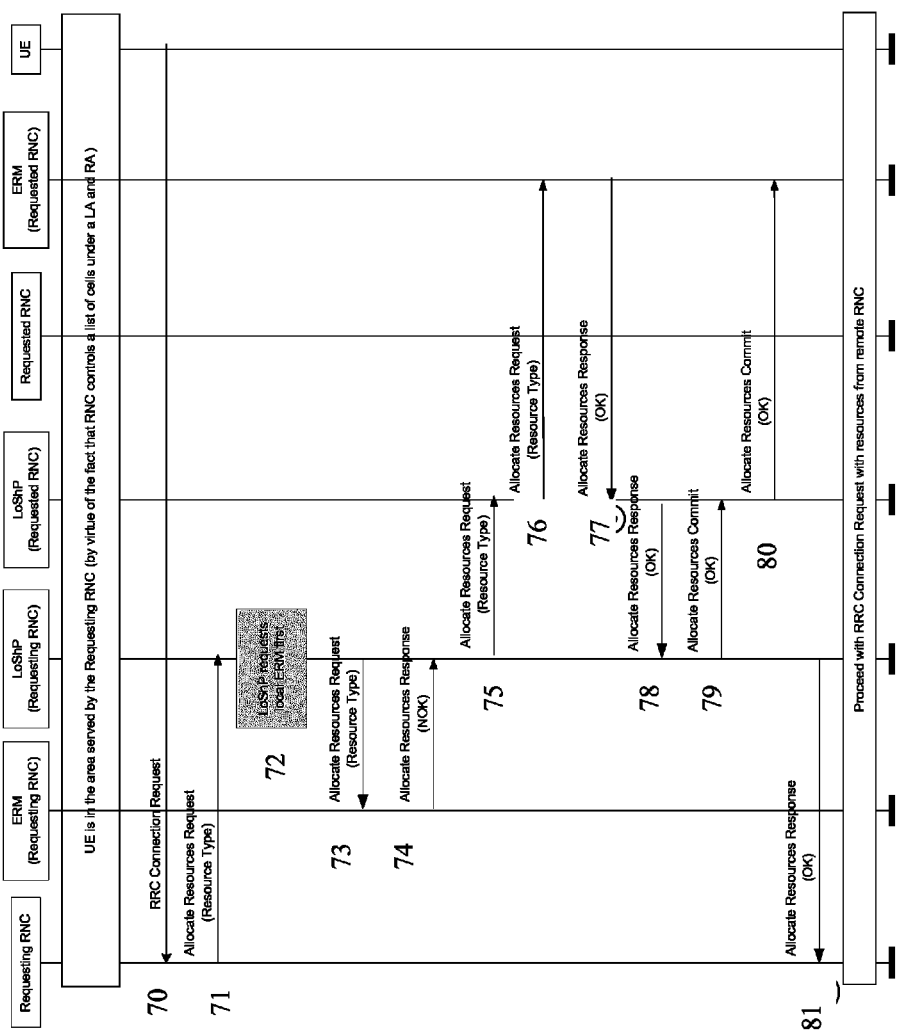

FIG. 7 shows a signalling flowchart for a requesting RNC that does not have processing resources for a UE. A radio resource control request message 70 is received from the UE at the RNC. A message 71 requesting for resource allocation is sent to the LoSHP function of the requesting RNC. The LoShP determines at 72 that a local entity resource management (ERM) of the requesting RNC is the first point of contact for obtaining the resource. The resource allocation request will then be passed by message 73 on to the local entity resource management (ERM) function of the requesting RNC. The local ERM response 74 is, however, can indicate that not all resources are available, or that none of the resources is available. In response thereto the resource request from a UE is passed by message 75 on to the LoShP of a requested RNC which in turn passes by message 76 the request on to the local ERM of the requested RNC. A positive response is received in message 77 and passed by allocate resource response message 78 to the LoShP of the requesting RNC.

A three way handshake can be provided at this stage. At 78 the resources are ready to be booked at the donor entity. The local LoSHP of the requesting RNC confirms by message 79 that resources are to be committed. The local LoSHP of the requested RNC then oases this indication by message 80 to the ERM of the requested RNC. Also, message 81 responding to the resource request is sent to the requesting RNC by the local LoShp thereof. The RNC can then proceed with the connection request with resources from the remote RNC.

A RRC connection request from a UE is thus resolved with resources allocated from a remote RNC. The requesting RNC can be unaware from where resources are procured as the LoShP brokers the resources with remote RNC(s).

In the signalling flowchart of FIG. 8 the Requesting RNC again does not have sufficient processing resources for the UE, and thus states 70 to 74 are as above. In response to message 74 the resource request can be passed by message 85 on to the LoShP of a requested RNCs which in turn can pass at 87 the request on to the local ERM of the requested RNC, as described above.

However, instead of passing the request just to one requested RNC, the RNC requesting for additional resources can send out a "broadcast" or "multicast" request (85, 86) to all other PRNCs which are a part of the resource pool. It also possible, instead of sending the allocate resources request messages to all RNC in the pool, the message can also be signalled to a predefined number of remote RNCs. For example, an operator can configure "time of day" based policies based on which resource requests are sent only to a sub-set of the total resource pool to optimize the total inter-RNC messaging traffic overhead within the RNC cluster. The operator can also choose to "protect" specific RNCs from receiving resource requests. The remote RN'C can then internally handle the signalling as indicated by messages 87, 89 and 88, 90.

When the message is sent to two or more PRNCs in the pool, both or all of these can respond, see messages 91 and 92. Only one of these can be selected and a three way handshake completed with the selected PRNC. A three way handshake can be such that both RNC1 and RNC2 respond OK at 91 and 92 to the request by the requesting RNC. The Requesting RNC may then send a final OK/"Commit" 93 to only RNC1. So, only resources at RNC1 are used. RNC2 will de-reserve resources because it did not receive the final OK/"Commit". The LoShP of the requested RNC1 can signal a commit message 94 to the ERM of RNC1. The local LoShP of the requesting RNC confirms this locally to the application by message 98.

The selection can be on e.g. the first response, best resource match and so on. This is denoted by message 93 in FIG. 8. The Requested RNC2 that does not complete the three way handshake can release the resource request internally. For example, this can be provided after timer expiry or any other mechanism left to implementation. In accordance with a specific example shown in FIG. 8 the local LoShP can especially release the ready 2nd donor RNC2 by exchange of messages 95 and 99. RNC2 can handle the release internally by release request and response messages 96 and 97 between the local LoShP and ERM thereof.

The first RNC can then proceed with the connection request with resources from the selected remote RNC.

The local resource management (RM) function of the resource offering or donor RNC can also support resource partitioning. In accordance with an aspect the local resource management needs to support the basic concept of resource partitioning to be able to provide only parts of required resources. Also, when a local load sharing protocol function signals a resource request to a local resource management function and only one sub-type of resource is available at this radio network control entity, the local resource management function can indicate this in its response back to the local load sharing protocol function.

Figure 8:
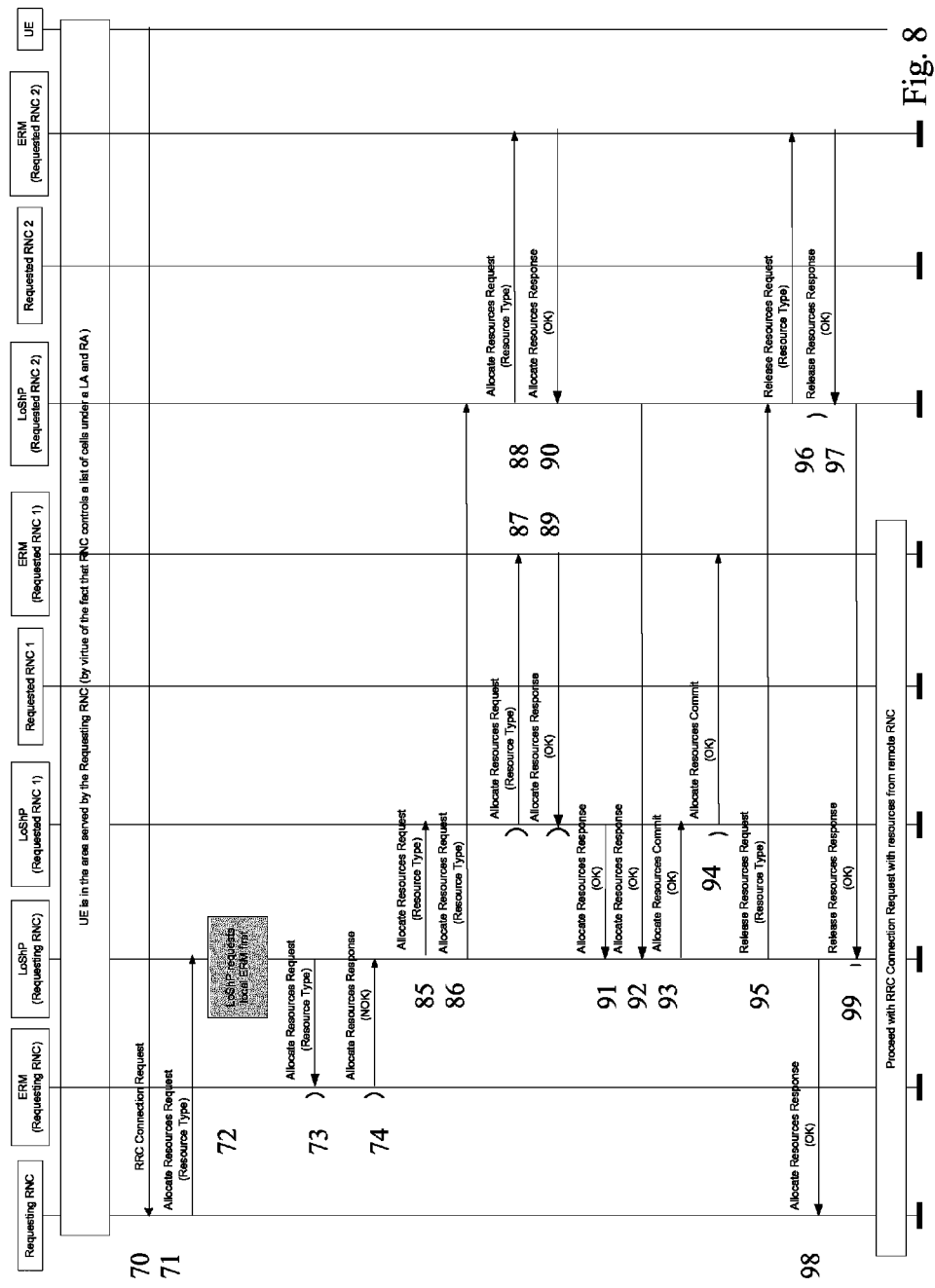

A physical radio network controller entity can provide a multiple of functionalities such as e.g. the local ERM, Layer 3 processing, etc. In the flowcharts of FIGS. 6 to 8 different functionalities have been depicted in separate blocks to provide an example of how the new "LoShP" function can be invoked within a PRNC.

Above described load sharing can be a useful tool for an operator since it permits using "latent" processing resources already present in an installed hardware base. In addition, this solution may be useful for operators when a large skew happens in control plane/user plane resource utilization profiles because rapid proliferation of certain types of devices, e.g. smartphones. Also, every time a new smartphone model comes into market, the operator does not necessarily have to re-dimension the network to suit that new device.

Each radio network control entity of the pool can be in the role of both a resource requester and a resource donor within the constraints of the local resource usage status and the statistical nature of offered traffic.

The RNC resource pool can be configurable by the operator using the standard O&M interfaces and functions.

The resource can be provided during RRC connection establishment. Also, an enhanced load balancing trigger to shift an UE with an ongoing connection to a less loaded RNC rather than dropping the UE can be provided. This could happen in current system e.g. when UE is in CELL or URA PCH and there is resource congestion.

Mobility of devices may also be improved by providing Serving Radio Network Subsystem (SRNS) relocation within RNC pool, thus improving key performance indicators (KPIs).

It is noted that the term resource is intended to cover a determined resource that is needed in its entirety or a sub-resource.

The various embodiments above can be provided as alternatives or as complementary solutions.

The required data processing apparatus and functions of a radio access network, a communication device and any other appropriate station or element may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Appropriate software and hardware can provide means for implementing the above described method. In accordance with an example, there is provided a computer program code product stored on a tangible medium and configured for implementing a method in a first radio network control entity, the method comprising determining shortage of at least one resource in the first radio network control entity that has joined a pool of radio network control resources, signalling from the first radio network control entity to at least one second radio network control entity of the pool a request for at least one resource, and using by the first radio network control entity at least one resource provided by at least one second radio network control entity.

In accordance with an example, there is provided a computer program code product stored on tangible medium and configured for implementing a method in a radio network control entity that has joined a pool of radio network control resources, the method comprising receiving in the second radio network control entity a request for at least one resource, the request being determined in response to shortage of at least one resource in a first radio network control entity, and offering for the first radio network control entity at least one resource provided by at least one of the second radio network control entities.

An appropriately adapted computer program code product or products may be used for implementing the embodiments, when loaded or otherwise provided on an appropriate data processing apparatus, for example for causing determinations when, what and where to communicate and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on 3GPP systems, similar principles can be applied to other communication systems. For example, the above principles can be used where relay nodes are employed for relaying transmissions. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

The invention claimed is:

1. A method in a first radio network control entity, comprising
determining shortage of at least one resource in the first radio network control entity that has joined a pool of radio network control resources,
signalling from the first radio network control entity to a plurality of second radio network control entities of the pool a request for at least one resource,
selecting a second radio network control entity of the plurality of second radio network control entities as provider of the resources,
signalling from the first radio network control entity a message based on the selection to the selected second radio network control entity,
signalling from the first radio network control entity a message to others of the plurality of second radio network control entities that were not selected to release provisionally allocated resources in the other second radio network control entities, and
using by the first radio network control entity at least one resource provided by the selected second radio network control entity.

2. A method in a pool of radio network control resources, comprising
receiving, from a first radio network control entity in the pool of radio network control resources, in a second radio network control entity of the pool a request for at least one resource, the request being determined in response to shortage of at least one resource in the first radio network control entity,
offering for the first radio network control entity at least one resource provided by the second radio network control entity and provisionally allocating the at least one resource,
performing one of the following:
receiving in the second radio network control entity signalling from the first radio network control entity comprising a message indicating a selection by the first radio network control entity of the selected second radio network control entity to provide the at least one resource, and providing by the second radio network control entity the at least one resource to the first radio network control entity; or
releasing by the second radio network control entity the provisionally allocated resources in response to reception of signalling from the first radio network control entity of a message indicating the provisionally allocated resources should be released or in response to expiry of a timer.

3. A method according to claim 1, wherein each of the first and second radio network control entities comprise a local load sharing protocol function and signalling between the first and second radio network control entities regarding load sharing is provided between the local load sharing protocol functions.

4. A method according to claim 3, wherein the first radio network control entity is not aware whether the at least one resource is provided locally or remotely by at least one second radio network control entity.

5. A method according to claim 3, wherein the local load sharing protocol function supports partitioning of resources into sub-resources and provision of sub-resources by the pool.

6. A method according to claim 1, comprising providing logical services by a local load sharing protocol function and translating between logical services and physical services by a local resource management function.

7. A method according to claim 1, comprising receiving responses from the plurality of second radio network control entities and selecting one of them as the selected provider of the at least one resource.

8. A method according to claim 1, comprising a radio network control entity dynamically joining and separating from the pool, and advertising its presence to the other members accordingly.

9. A method according to claim 1, performed as part of a three way handshake.

10. A method in a first radio network control entity, comprising
determining shortage of at least one resource in the first radio network control entity that has joined a pool of radio network control resources,
signalling from the first radio network control entity to at least one second radio network control entity of the pool a request for at least one resource,
using by the first radio network control entity at least one resource provided by at least one second radio network control entity,
wherein each of the radio network control entities comprises a local load sharing protocol function and a local resource management function, the method further comprising:
signalling to the local load sharing protocol function a first message requesting for allocation of the at least one resource,
signalling from the local load sharing protocol function to a local resource management function a second message requesting for allocation of the at least one resource, and
signalling from the local resource management function a third message in response to the second message, and in response to the third message either providing the requested at least one resource by the radio network control entity, or signalling at least one fourth message requesting for allocation of the at least one resource by at least one second radio network control entity.

11. A method according to claim 1, comprising signalling information regarding availability of requested resources or parts thereof.

12. Apparatus for a first radio network control entity that has joined a pool of radio network control resources, the apparatus comprising at least one processor, and at least one memory including computer program code, the at least one memory and the computer program code being configured to, with the at least one processor, cause the apparatus at least to
determine shortage of at least one resource in the first radio network control entity,
signal to a plurality of second radio network control entities of the pool a request for at least one resource,
select a second radio network control entity of the plurality of second radio network control entities as provider of the resources,
cause signalling from the first radio network control entity of a message based on the selection to the selected second radio network control entity,
cause signalling from the first radio network control entity of a message to others of the plurality of second radio network control entities that were not selected to release provisionally allocated resources in the other second radio network control entities, and
use by the first radio network control entity at least one resource provided by the selected second radio network control entity.

13. Apparatus for a second radio network control entity that has joined a pool of radio network control resources comprising a first radio network control entity and at least one second radio network control entity, the apparatus comprising at least one processor, and at least one memory including computer program code, the at least one memory and the computer program code being configured to, with the at least one processor, cause the apparatus at least to
receive, from a first radio network control entity in the pool of radio network control resources, at the second radio network control entity a request for at least one resource, the request being determined in response to shortage of at least one resource in the first radio network control entity,
offer for the first radio network control entity at least one resource provided by the second radio network control entity and provisionally allocating the at least one resource,
performing one of the following:
receiving in the second radio network control entity signalling from the first radio network control entity comprising a message indicating a selection by the first radio network control entity of the selected second radio network control entity to provide the at least one resource, and providing by the second radio network control entity the at least one resource to the first radio network control entity; or
releasing by the second radio network control entity the provisionally allocated resources in response to reception of signalling from the first radio network control entity of a message indicating the provisionally allocated resources should be released or in response to expiry of a timer.

14. Apparatus according to claim 12, comprising a local load sharing protocol function configured for signalling between the first and second radio network control entities, wherein the first radio network control entity is not aware whether the at least one resource is provided locally or remotely by at least one second radio network control entity.

15. Apparatus according to claim 12 configured to support partitioning of resources into sub-resources and provision of sub-resources by the pool.

16. Apparatus according to claim 12, configured to receive responses from the plurality of radio network control entities and select one of them as the selected provider of the at least one resource.

17. Apparatus according to claim 12 configured to provide a three way handshake as part of resource sharing between the first and second radio network control entities.

18. Apparatus for a first radio network control entity that has joined a pool of radio network control resources, the apparatus comprising at least one processor, and at least one memory including computer program code, the at least one memory and the computer program code being configured to, with the at least one processor, cause the apparatus to perform operations comprising
determine shortage of at least one resource in the first radio network control entity,
signal to at least one second radio network control entity of the pool a request for at least one resource, use by the first radio network control entity at least one resource provided by at least one second radio network control entity, implementing a local load sharing protocol function and a local resource management function of a radio network control entity, signalling from the local load sharing protocol function to the local resource management function a message requesting for allocation of the at least one resource, signalling from the local resource management function a response to the message, and in response thereto either providing of the requested at least one resource by the radio network control entity, or signalling a request for allocation of at least one resource by at least one second radio network control entity.

19. A computer program product comprising a non-transitory computer readable medium having program code, wherein the program codes causes a data processing apparatus to perform the method of claim 1 when the program is run on the data processing apparatus.

20. A computer program product comprising a non-transitory computer readable medium having program code, wherein the program codes causes a data processing apparatus to perform the method of claim 2 when the program is run on the data processing apparatus.

* * * * *